US009841992B2

(12) United States Patent
Sato

(10) Patent No.: US 9,841,992 B2
(45) Date of Patent: Dec. 12, 2017

(54) INFORMATION PROCESSING DEVICE, INFORMATION PROCESSING SYSTEM, AND INTERRUPT DEVICE CONTROL METHOD

(71) Applicant: FUJITSU LIMITED, Kawasaki-shi, Kanagawa (JP)

(72) Inventor: Kenta Sato, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 51 days.

(21) Appl. No.: 14/722,293

(22) Filed: May 27, 2015

(65) Prior Publication Data
US 2015/0378794 A1 Dec. 31, 2015

(30) Foreign Application Priority Data

Jun. 30, 2014 (JP) ................................. 2014-134414

(51) Int. Cl.
G06F 9/48 (2006.01)
G06F 9/54 (2006.01)

(52) U.S. Cl.
CPC ............ G06F 9/4812 (2013.01); G06F 9/546 (2013.01)

(58) Field of Classification Search
CPC . G06F 9/48; G06F 9/546; G06F 13/24; G06F 9/4812
See application file for complete search history.

(56) References Cited

U.S. PATENT DOCUMENTS

| 2002/0174165 | A1  | 11/2002 | Kawaguchi |
| 2006/0053237 | A1  | 3/2006  | Franchuk et al. |
| 2010/0082866 | A1* | 4/2010  | White ............... G06F 1/3203 710/260 |
| 2010/0191911 | A1* | 7/2010  | Heddes ............. G06F 15/16 711/118 |
| 2010/0223437 | A1* | 9/2010  | Park ................. G06F 12/12 711/159 |
| 2012/0250512 | A1* | 10/2012 | Jagadeeswaran ..... H04L 47/12 370/235.1 |

(Continued)

FOREIGN PATENT DOCUMENTS

| JP | 2002-342299 | 11/2002 |
| JP | 2011-239469 | 11/2011 |
| JP | 2013-214168 | 10/2013 |

Primary Examiner — Brian W Wathen
(74) Attorney, Agent, or Firm — Staas & Halsey LLP

(57) ABSTRACT

Information processing device includes: a first storage unit for storing processing information indicative of predetermined processing and for sequentially outputting the stored processing information; a second storage unit for storing the processing information; a request management unit operative to receive and to store the received processing information in the first storage unit when available, and to store the received processing information in the second storage unit when the first storage unit is unavailable; a request acquisition unit operative to sequentially acquire the processing information output by the first storage unit when the processing information is present in the first storage unit, and search the second storage unit so as to detect and acquire the processing information when the processing information is absent in the first storage unit; and a processing execution unit to perform the predetermined processing according to the acquired processing information.

9 Claims, 7 Drawing Sheets

(56) References Cited

U.S. PATENT DOCUMENTS

2013/0262783 A1    10/2013  Okada et al.
2015/0149121 A1*   5/2015   Ahmed .................... G06F 3/06
                                                      702/190
2016/0149801 A1*   5/2016   Morosan ................ H04L 45/22
                                                      370/228

* cited by examiner

FIG. 4

| 1 bit | RECEIVING-SIDE AVAILABILITY NOTIFICATION INTERRUPT FLAG |
|---|---|
| 4 bit | NUMBER OF RECEIVED MESSAGES<br>0000: UNRECEIVABLE, 0001: 4, 0010: 8, 0011:16, 0100: 32, 0101: 64, 0110: 128, 0111:256, 1000: 512, 1001: 1024, 1010: 2048, 1011: 4096, 1100: 8192 |
| 2 bit | NUMBER OF AVAILABLE MESSAGES AS CONDITION FOR INTERRUPT ISSUANCE<br>00: 1, 01: 4, 10: 16, 11: 1/8 OF NUMBER OF RECEIVED MESSAGES |
| 1 bit | MESSAGE RECEIVED INTERRUPT FLAG |
| 1 bit | AVAILABILITY NOTIFICATION INTERRUPT PENDING FLAG |
| 1 bit | MESSAGE RECEIVED INTERRUPT PENDING FLAG |
| 41 bit | RECEIVED DATA RECORDING LOCATION INFORMATION |

FIG. 5

| 1 bit | INTERRUPT REGISTER WRITE FLAG |
|---|---|
| 1 bit | INTERRUPT QUEUE FULL FLAG |

FIG. 6

| 13 bit | REGISTER SET ID |
|---|---|
| 1 bit | MESSAGE RECEIVED FLAG |
| 1 bit | AVAILABILITY NOTIFICATION INTERRUPT FLAG |

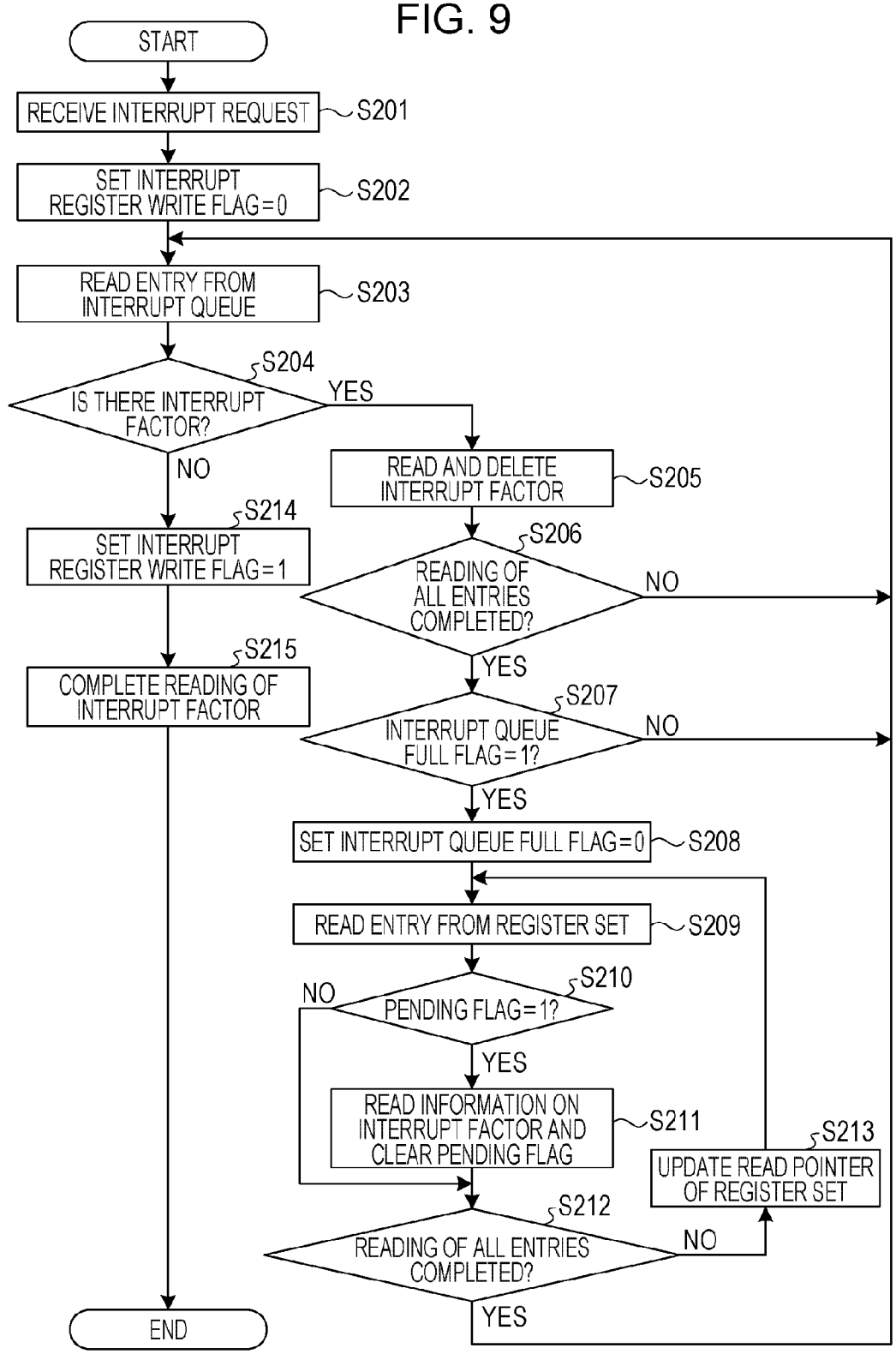

INFORMATION PROCESSING DEVICE, INFORMATION PROCESSING SYSTEM, AND INTERRUPT DEVICE CONTROL METHOD

CROSS-REFERENCE TO RELATED APPLICATION

This application is based upon and claims the benefit of priority of the prior Japanese Patent Application No. 2014-134414, filed on Jun. 30, 2014, the entire contents of which are incorporated herein by reference.

FIELD

The embodiment discussed herein is related to an information processing device, an information processing system, and an interrupt device control method.

BACKGROUND

The technology of inter-process communication (IPC) in which, when plural pieces of software perform processing in cooperation with each other, data used by each piece of software is transmitted and received is conventionally known. As an example of a technique for such inter-process communication, a technique using queues for inter-process communication is known.

An information processing system includes a plurality of nodes that include respective individual central processing units (CPUs). Technology of a multi-node system is known in which a plurality of CPUs perform respective different processes. As an example of such technology of a multi-node system, there is known an information processing system in which a plurality of CPUs having the function of caching data are included and the CPUs perform respective different processes at the same time. Furthermore, technology of a shared memory system is known in which CPUs execute operating systems (OSs) independent of each other, respectively, and part of a memory region is shared by the CPUs. With such a configuration, it is possible to increase the capacity more. In addition, since an OS individually operates on each node, errors may be stopped from spreading. This makes it possible to improve the availability of the system.

Each node includes a local memory, hypervisor (HPV) software, an OS, and a device driver and performs user processes different from each other at the same time. Note that the HPV software is software that manages virtual machines run by the nodes. In such an information processing system, a write pointer and a read pointer are stored in a shared memory shared by the nodes, thus implementing a queue. Inter-process communication of user processes is thus performed between nodes.

A transmitting-side node in inter-process communication is provided with a transmission message register dedicated to each core or thread. Using application software executed by a CPU of the transmitting-side node, a message is written to a transmission message register and the written message is transmitted to a receiving-side node. The message transmitted contains an identifier (ID) of a CPU of the destination and a register set ID.

The receiving-side node is provided with an address register, a read pointer, a write pointer, and a register set including a plurality of entries. The receiving-side node writes a message in a storage region indicated by entry information of a register set selected by the register set ID designated by the transmitting-side node.

Here, the ways in which a user process of the receiving-side node detects message reception include two ways: polling monitoring and a message received interrupt.

In the case where polling monitoring is performed, a user process carries out checks for message reception at regular intervals regardless of the presence or absence of reception of a message. Then, the user process, when detecting a message during a check for message reception, performs a process of reading a message.

In the case where a message received interrupt is performed, the user process on the receiving side is in a sleep state. Then, upon receiving an interrupt request from a CPU, the user process performs a context switch and performs the process of reading a message. Japanese Laid-open Patent Publication No. 2013-214168 is an example of this kind of related art techniques.

However, in a message received interrupt technique, a CPU issues an interrupt request each time a message is received. Specifically, the CPU of the receiving-side node, upon receiving a message, sets an interrupt factor in a register set and issues an interrupt request to a user process.

Here, when the number of entries of a register set of a message receiving circuit is large, that is, when the number of messages that may be received is large, the number of issued interrupt requests is increased. Information of a register set is recorded on a high-capacity medium such as a random access memory (RAM). Consequently, it takes time to search for interrupt factors stored in the register set, and it takes much time to perform an interrupt reap process in which interrupt factors are collected.

In view of the above, the techniques of this disclosure are directed to providing an information processing device, an information processing system, and an interrupt device control method for performing an interrupt reap process at high speed.

SUMMARY

According to an aspect of the invention, an information processing device includes: a first storage unit for storing processing information indicative of predetermined processing and for sequentially outputting the stored processing information; a second storage unit for storing the processing information; a request management unit operative to receive and to store the received processing information in the first storage unit when available, and to store the received processing information in the second storage unit when the first storage unit is unavailable; a request acquisition unit operative to sequentially acquire the processing information output by the first storage unit when the processing information is present in the first storage unit, and search the second storage unit so as to detect and acquire the processing information when the processing information is absent in the first storage unit; and a processing execution unit to perform the predetermined processing according to the acquired processing information.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of entry information of a register set;

FIG. 5 is a diagram illustrating an example of entry information of an interrupt register;

FIG. 6 is a diagram illustrating an example of entry information of an interrupt queue;

FIG. 9 is a flowchart of a process of reaping interrupt factors performed by the information processing device according to the embodiment.

DESCRIPTION OF EMBODIMENT

Hereinbelow, an embodiment of an information processing device, an information processing system, and an interrupt device control method will be described in detail with reference to the accompanying drawings. It is to be noted that the information processing device, the information processing system, and the interrupt device control method disclosed in this application are not limited by the embodiment given below.

Embodiment

Figure 1:
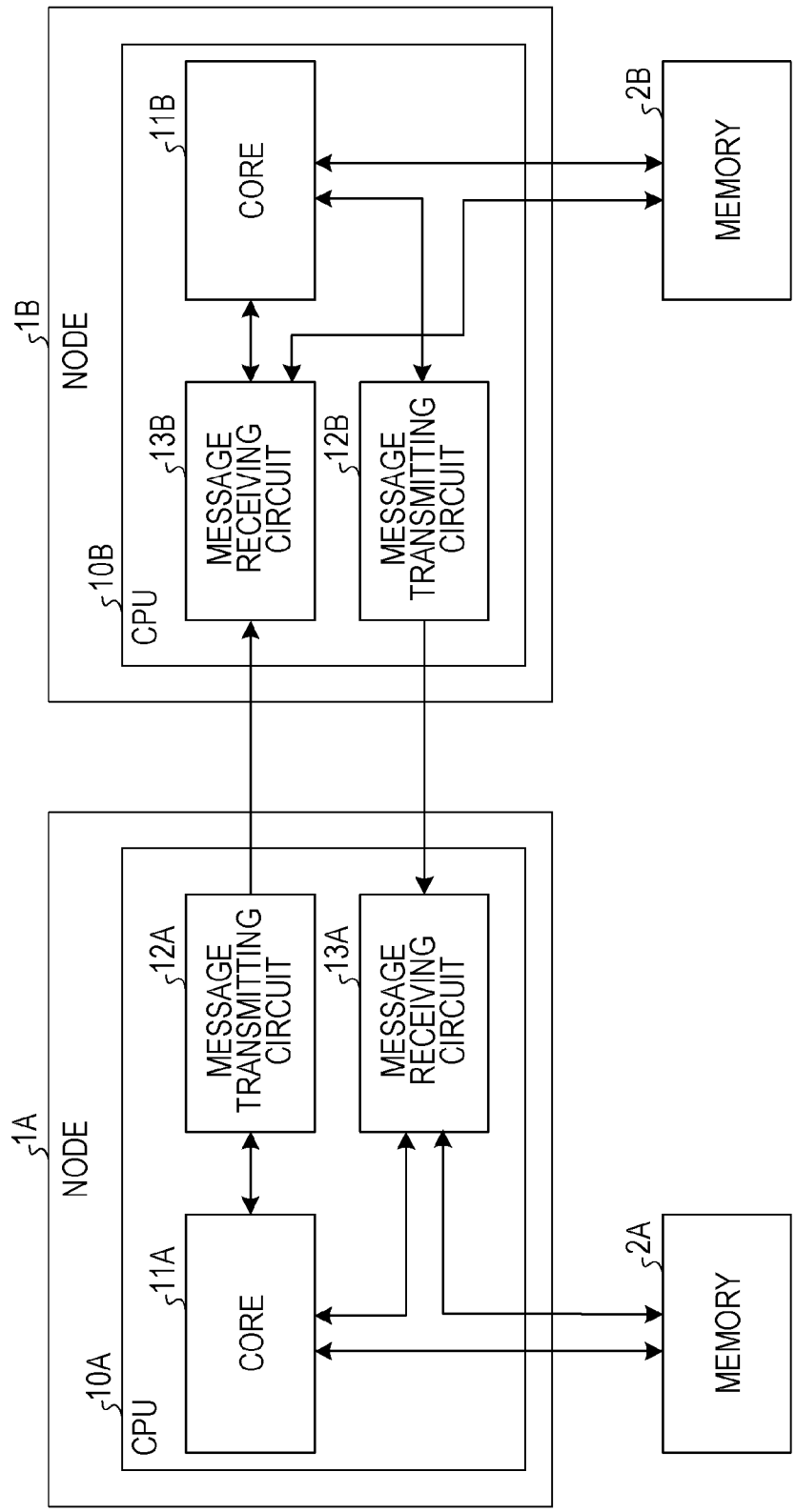
FIG. 1 is a system configuration diagram of an information processing system that performs inter-node message communication.

FIG. 1 is a system configuration diagram of an information processing system that performs inter-node message communication. Communication between two nodes, a node 1A and a node 1B, will be described here. The node A and the node B have the same functions. An information processing system according to this embodiment includes a memory 2A and a memory 2B that correspond to the node 1A and the node 1B, respectively. However, the memory 2A and the memory 2B may be one shared memory for use by both the node 1A and the node 1B. Although an example of the node 1A will be described here, components of the node 1B have functions similar to those of components of the node 1A.

The node 1A includes a CPU 10A, and the CPU 10A includes a core 11A, a message transmitting circuit 12A, and a message receiving circuit 13A. A CPU 10B of the node 1B includes a core 11b, a message transmitting circuit 12B, and a message receiving circuit 13B. The case where one core is included in each of the nodes 1A and 1B is described here; however, two or more cores may be included in each CPU.

The core 11A outputs, to a message transmitting circuit 12A, a register read request to the node 1B, as an instruction issued to the message transmitting circuit 12A for transmitting a message. Then, the core 11A receives, from the message transmitting circuit 12A, a response to the instruction for transmitting the register read request.

The core 11A also outputs a register read request or a register write request to the message receiving circuit 13A.

Then, the core 11A receives a response to the register read request or the register write request from a message receiving circuit 13A.

The core 11A also acquires an interrupt request from the message receiving circuit 13A. Upon acquiring the interrupt request from the message receiving circuit 13A, the core 11A performs processing in accordance with the interrupt request. The processing indicated by an interrupt request is not limited and includes, for example, arithmetic processing, processing of writing and reading data, and the like.

The message transmitting circuit 12A receives a register read request from the core 11A. Then, the message transmitting circuit 12A transmits a message designated in the register read request to another designated node, which is here the message receiving circuit 13B of the node 1B. The message transmitting circuit 12A also transmits a result of message transmission as a response to the core 11A.

The message transmitting circuit 12A receives a response to message transmission from the node 1B. Then, based on a result of message transmission indicated by the response, the message transmitting circuit 12A generates a response to a register read request or a register write request and outputs the generated response to the core 11A.

The message receiving circuit 13A receives a register read request or a register write request from the core 11A. Then, the message receiving circuit 13A performs processing for a register in accordance with the received request. For example, the message receiving circuit 13A, when receiving a register read request from the core 11A, reads data from the register and transmits the read data to the core 11A.

Next, details of the message transmitting circuits 12A and 12B and the message receiving circuits 13A and 13B will be described. Assuming that the node 1A is a transmitting-side node and the node 1B is a receiving-side node, the case where a message is transmitted from the node 1A to the node 1B will be described below.

Figure 2:
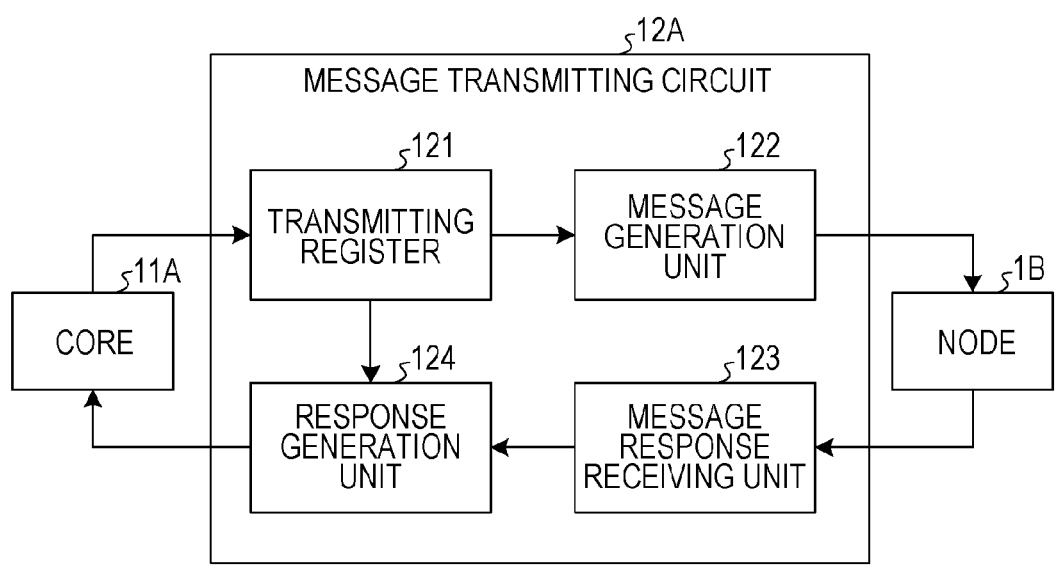
FIG. 2 is a block diagram illustrating details of a message transmitting circuit.

FIG. 2 is a block diagram illustrating details of the message transmitting circuit 12A of the node 1A. As illustrated in FIG. 2, the message transmitting circuit 12A includes a transmitting register 121, a message generation unit 122, a message response receiving unit 123, and a response generation unit 124.

The transmitting register 121 receives a register read request from the core 11A. Then, the transmitting register 121 stores the received register read request. The transmitting register 121 further outputs, to the response generation unit 124, a result of the processing of storing the register read request.

The message generation unit 122 confirms that the register read request is stored in the transmitting register 121. Then, the message generation unit 122 generates a message in accordance with the stored register read request. The message generation unit 122 then transmits the generated message to the node 1B.

The message response receiving unit 123 receives, from the node 1B, a response indicating a result of reception of a message output by the message generation unit 122. Then, the message response receiving unit 123 outputs the received response to the response generation unit 124.

The response generation unit 124 receives, from the transmitting register 121, input of a result of the processing of storing the register read request. Then, the response generation unit 124 generates a response indicating the result of the processing of storing the register read request. Subsequently, the response generation unit 124 outputs, to the core 11A, the generated response indicating the result of the processing of storing the register read request.

The response generation unit 124 also receives, from the message response receiving unit 123, input of a response indicating a result of reception of a message from the node 1B. Then, the response generation unit 124 generates a response indicating the result of reception of the message of the node 1B. Subsequently, the response generation unit 124 outputs, to the core 11A, the generated response indicating the result of reception of the message of the node 1B.

Figure 3:
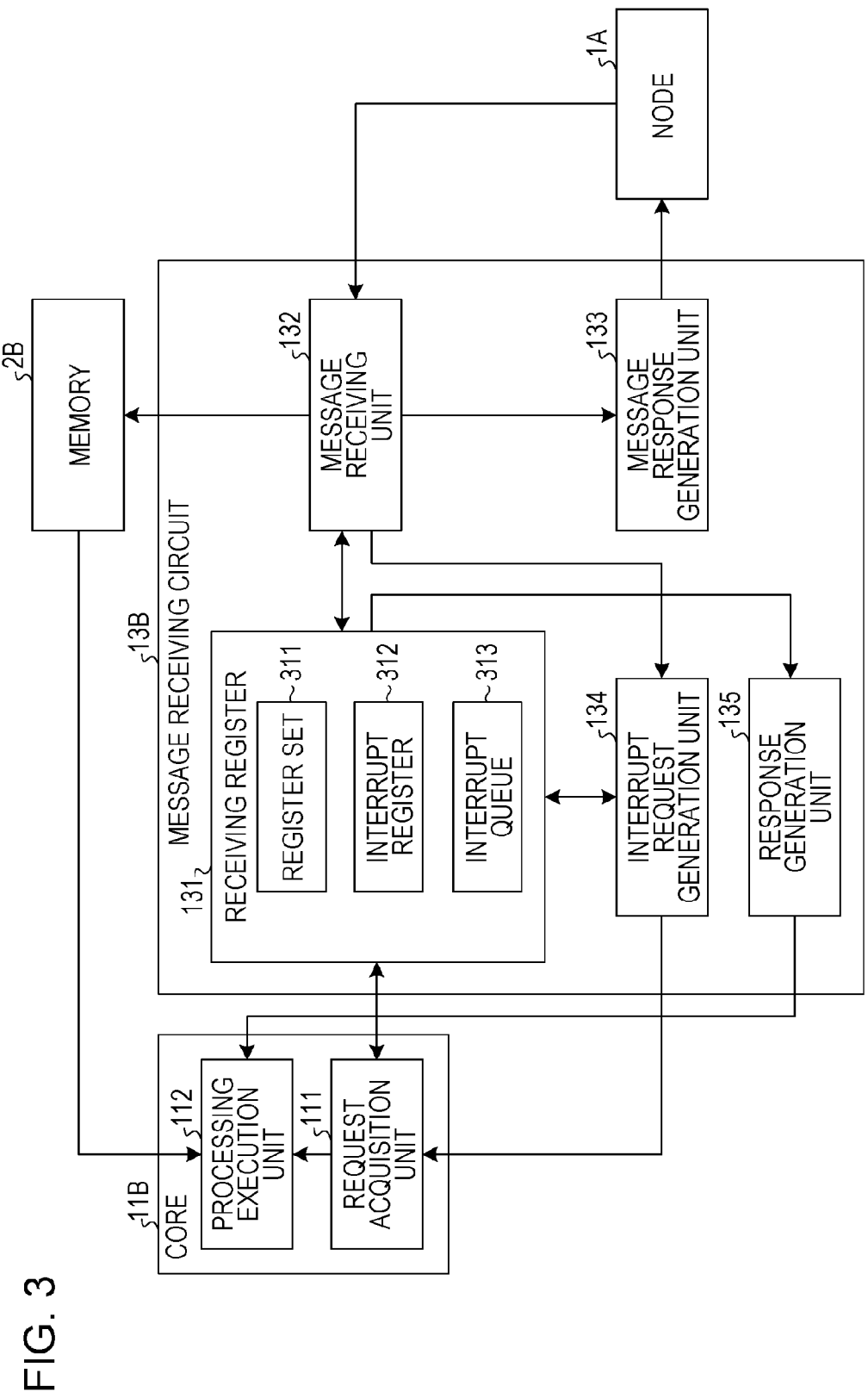
FIG. 3 is a block diagram illustrating details of a message receiving circuit.

FIG. 3 is a block diagram illustrating details of the message receiving circuit 13B of the node 1B. As illustrated in FIG. 3, the message receiving circuit 13B includes a receiving register 131, a message receiving unit 132, a message response generation unit 133, an interrupt request generation unit 134, and a response generation unit 135.

The receiving register 131 includes a register set 311, an interrupt register 312, and an interrupt queue 313.

The register set 311 includes an address register, a read pointer, and a write pointer. For the register set 311, a plurality of entries are used in accordance with the number of cores of the transmitting-side node and the number of pieces of processing that may be performed in a parallel-processing manner by the core on the receiving side concerned. In the case where a predetermined number of registers among general purpose registers included in the CPU 10B are used as the register set 311 for the receiving register, the number of entries to be used in the register set 311 is determined depending on the number of general purpose registers in some cases.

Each entry of the register set 311 stores items illustrated in FIG. 4. FIG. 4 is a diagram illustrating an example of entry information of the register set 311. FIG. 4 illustrates information of each entry stored in the register set 311 and the number of bits used for the entry. The register set 311 corresponds to an example of a "second storage unit". Note that, hereinafter, an individual entry of the register set 311 is sometimes referred to simply as the register set 311.

A receiving-side availability notification interrupt flag is a flag indicating whether or not to use an availability notification interrupt in the receiving-side node (here, the node 1B). The availability notification interrupt is an interrupt with which, when the register set 311 capable of receiving a message is secured in the receiving-side node, the core 11A is notified that reception of a message has become possible. For example, an availability notification interrupt is issued when a predetermined number or more of register sets 311 enter a state in which a message may be stored. The receiving-side availability notification interrupt flag is set in response to an instruction issued in advance by an operator. In this embodiment, description will be given of the case where the receiving-side availability notification interrupt flag is set to "enable".

The number of received messages represents the number of messages received by the node 1B. The number of received messages represents the number of messages received as 4-bit information, as illustrated in FIG. 4.

The number of available messages as the condition for interrupt issuance represents the number of messages serving as the condition for issuing an availability notification interrupt.

A message received interrupt flag is a flag indicating whether or not to use a message received interrupt. If the message received interrupt flag is "disable", the node 1B detects message reception by performing polling monitoring. If the message received interrupt flag is "enable", the node 1B detects message reception by receiving a message. The message received interrupt flag is set in response to an instruction issued in advance by an operator. In this embodiment, description will be given of the case where the message received interrupt flag is set to "enable".

An availability notification interrupt pending flag is a flag indicating whether or not the register set 311 stores information on an availability notification interrupt.

A message received interrupt pending flag is a flag indicating whether or not the register set 311 stores information on a receiving-side message received interrupt. The availability notification interrupt pending flag and the message received interrupt pending flag correspond to examples of "waiting information".

Received data recording location information is information on the address of a memory at which data contained in a received message is stored.

The interrupt register 312 stores entries of items illustrated in FIG. 5. FIG. 5 is a diagram illustrating an example of entry information of an interrupt register. FIG. 5 illustrates information on each entry stored in the interrupt register 312 and the number of bits used for the entry.

An interrupt register write flag is a flag indicating whether or not to permit issuance of an interrupt request. When the flag is "disable", issuance of an interrupt request in the receiving-side node is prohibited. In contrast, when the flag is "enable", issuance of an interrupt request in the receiving-side node is permitted. In this embodiment, the value of the interrupt register write flag, when being "0", indicates disable, and, when being "1", indicates enable.

An interrupt queue FULL flag indicates that the interrupt queue 313 is filled with entries. In this embodiment, the interrupt queue FULL flag "0" indicates that the interrupt queue 313 is not full and still has an area capable of storing entries. The interrupt queue FULL flag "1" indicates that the interrupt queue 313 is full and has no area capable of storing entries. The interrupt queue FULL flag corresponds to an example of "information on a filled state".

The interrupt queue 313 has, for example, a first in first out (FIFO) structure. It is preferable that the number of entries that are capable of being stored in the interrupt queue 313 be determined depending on the operational state of the node 1B, such as the frequency with which an interrupt request is made, and the placement space. For example, it may be determined that the interrupt queue 313 is capable of storing up to 64 entries.

The interrupt queue 313 stores entries of items illustrated in FIG. 6. FIG. 6 is a diagram illustrating an example of entry information of an interrupt queue. FIG. 6 illustrates information on each entry stored in the interrupt queue 313 and the number of bits used for the entry. The interrupt queue 313 corresponds to an example of a "first storage unit".

A register set ID is a register set ID stored in a message transmitted by the node 1A. Information indicating a received message is stored in the interrupt queue 313 as described below, and this register set ID is a register set ID included in the message.

A message received flag is a flag indicating that a message has been received. The message received flag, when "1", indicates that the node 1B has received a message and the interrupt queue 313 stores information on a message received interrupt. The message received flag, when "0", indicates that the node 1B has not received a message, and indicates that the interrupt queue 313 does not store information on a message received interrupt.

An availability notification interrupt flag is a flag indicating that information on availability notification is stored. The availability notification interrupt flag, when "1", indicates that the interrupt queue 313 stores information on an availability notification interrupt. The availability notification interrupt flag, when "0", indicates that the interrupt queue 313 does not store information on an availability notification interrupt.

The message received interrupt and the availability notification interrupt will be referred to collectively as "interrupt factors" hereinafter. Additionally, the message received flag and the availability notification interrupt flag in the interrupt queue 313 will be referred to collectively as "interrupt factor information". Identifying an interrupt factor upon receiving an interrupt request, or performing processing of a received message in accordance with the interrupt factor, corresponds to an example of "identifying processing".

When information on an interrupt factor is written to or read from the register set 311, the interrupt register 312 or the interrupt queue 313, the receiving register 131 outputs a result of the writing or reading to the response generation unit 135.

Referring back to FIG. 3, description will be continued. The message receiving unit 132 receives a message from the node 1A.

The message receiving unit 132 acquires a register set ID from the received message. Subsequently, the message receiving unit 132 stores the received message in the memory 2B. Next, the message receiving unit 132 checks the message received interrupt flag for an entry of the register set 311 identified by the acquired register set ID.

If the message received interrupt flag is "disable", the message receiving unit 132 stores information on a received interrupt in the identified entry of the register set 311. The message receiving unit 132 also stores the address of the memory 2B at which the message is stored, in the received data recording location information of the register set 311. Additionally, the message receiving unit 132 registers each piece of entry information in the register set 311.

If the message received interrupt flag is "enable", the message receiving unit 132 registers the register set ID acquired from the received message in the interrupt queue 313. Next, the message receiving unit 132 sets the message received flag of the interrupt queue 313 to on. Additionally, the message receiving unit 132 registers the address of the memory 2B at which the message is stored, in the received data recording location information of the register set 311 identified by the register set ID acquired from the received message. The message receiving unit 132 also registers each piece of entry information in the register set 311. In this case, the message receiving unit 132 sets, to off, the availability notification interrupt pending flag and the message received interrupt pending flag of the register set 311.

Subsequently, the message receiving unit 132 checks the interrupt queue FULL flag of the interrupt register 312. If the interrupt queue FULL flag is "0", the message receiving unit 132 acquires the number of interrupt queues stored in the interrupt queue 313. If the number of interrupt queues stored in the interrupt queue 313 is the number obtained by subtracting one from the upper limit (hereinafter, the number being referred to as "FULL-1"), the message receiving unit 132 sets the interrupt queue FULL flag of the interrupt register 312 to "1". In contrast, if the number of interrupt queues stored in the interrupt queue 313 is less than "FULL-1", the message receiving unit 132 maintains the interrupt queue FULL flag to "0".

Subsequently, the message receiving unit 132 checks the interrupt register flag of the interrupt register 312. If the interrupt register write flag is "enable", the message receiving unit 132 instructs the interrupt request generation unit 134 to generate an interrupt request. In contrast, if the interrupt register write flag is "disable", the message receiving unit 132 finishes a process of storing an interrupt factor without providing an instruction for generation of an interrupt request to the interrupt request generation unit 134.

On the other hand, if the interrupt queue FULL flag is "1", the message receiving unit 132 acquires a register set ID stored in the message and identifies the register set 311 storing information on a message received interrupt.

The message receiving unit 132 then sets the message received interrupt pending flag of the identified register set 311 to on. The message receiving unit 132 also registers the address of the memory 2B at which the message is stored, in the received data recording location information of the register set 311 having the register set ID acquired from the received message. Additionally, the message receiving unit 132 registers each piece of entry information in the register set 311.

Subsequently, the message receiving unit 132 notifies the message response generation unit 133 that message reception has been completed.

The message receiving unit 132 also monitors the number of register sets 311 in which messages are stored. Then, when the number of register sets 311 in which messages are stored exceeds a given threshold that is larger than or equal to the number determined in an interrupt issuance condition, the message receiving unit 132 notifies the message response generation unit 133 to stop receiving a message. The message receiving unit 132 corresponds to an example of a "request management unit".

The message response generation unit 133 receives, from the message receiving unit 132, notification that reception of a message is to be stopped or that message reception has been completed. Then, the message response generation unit 133 generates a response to transmission of a message of the node 1A, in accordance with the received notification. Subsequently, the message response generation unit 133 transmits the generated response to the node 1A.

The interrupt request generation unit 134 monitors the usage state of the register sets 311 and acquires the number of register sets 311 in which no message is stored. Here, the interrupt request generation unit 134 may store the total number of register sets 311 for use for storage of messages. The interrupt request generation unit 134 then compares the number of available messages as the condition for interrupt issuance registered in the register set 311 with the number of register sets 311 in which the acquired message is not stored, and determines whether or not the issuance condition for an availability notification interrupt is satisfied.

When the issuance condition for an availability notification interrupt is satisfied, the interrupt request generation unit 134 checks the receiving-side availability notification interrupt flag of the register set 311.

If the receiving-side availability notification interrupt flag is "disable", the interrupt request generation unit 134 finishes the process of storing a request for an availability notification interrupt.

On the other hand, if the receiving-side availability notification interrupt flag is "enable", the interrupt request generation unit 134 determines whether or not the interrupt queue FULL flag is "1".

When the interrupt queue FULL flag is not "1", the availability notification interrupt flag of the interrupt queue 313 is set to on. Processing of notification of availability indicated by this availability notification interrupt flag corresponds to an example of "notification processing".

Subsequently, the interrupt request generation unit 134 acquires the number of queues stored in the interrupt queue 313. If the number of queues stored in the interrupt queue 313 is "FULL-1", the interrupt request generation unit 134 sets the interrupt queue FULL flag of the interrupt register 312 to "1". In contrast, if the number of queues stored in the interrupt queue 313 is less than "FULL-1", the interrupt request generation unit 134 maintains the interrupt queue FULL flag of "0".

Subsequently, the interrupt request generation unit 134 checks the interrupt register write flag of the interrupt register 312. If the interrupt register write flag is "enable", the interrupt request generation unit 134 generates a request for an availability notification interrupt. Then, the interrupt request generation unit 134 transmits the generated request for an availability notification interrupt to the core 11B. In contrast, if the interrupt register write flag is "disable", the interrupt request generation unit 134 finishes a process of storing an interrupt factor without generating a request for an availability notification interrupt.

On the other hand, if the interrupt queue FULL flag is "1", the interrupt request generation unit 134 identifies the register set 311 storing a request for an availability notification interrupt, based on the register set ID stored in the received message.

The interrupt request generation unit 134 then sets the availability notification interrupt pending flag of the identified register set 311 to on. Additionally, the interrupt request generation unit 134 registers each entry in the register set 311.

Upon receiving, from the message receiving unit 132, an instruction for generating a request for a message received interrupt, the interrupt request generation unit 134 generates a request for a message received interrupt. Subsequently, the interrupt request generation unit 134 transmits the generated request for a message received interrupt to the core 11B. The interrupt request generation unit 134 corresponds to an example of a "notification processing generation unit". The request for a message received interrupt and the request for an availability notification interrupt correspond to examples of an "execution request".

As such, the message receiving unit 132 and the interrupt request generation unit 134 issue interrupt requests if the interrupt register write flag is "enable", and do not issue interrupt requests if the interrupt register write flag is "disable". However, independently of the interrupt register write flag, the message receiving unit 132 and the interrupt request generation unit 134 will store interrupt factors. That is, even if no interrupt request is issued, interrupt factors will be stored in the interrupt queue 313 or the register set 311 when a message is not stopped from being received. If the interrupt queue FULL flag is not "1", the register set ID identifying an entry of the register set 311 in which interrupt factors are stored will be stored in the interrupt queue 313.

The response generation unit 135 acquires, from the receiving register 131, a result of writing to or reading from the acquired register set 311, the interrupt register 312, or the interrupt queue 313. Then, the response generation unit 135 generates a response in accordance with a result of writing to or reading from the acquired register set 311, the interrupt register 312 or the interrupt queue 313. Subsequently, the response generation unit 135 transmits the generated response to the core 11B.

The core 11B runs the OS. The core 11B executes applications and the like on the OS and runs a user process. The core 11B includes a request acquisition unit 111 and a processing execution unit 112. Either one or both of the OS and the user process sometimes serve as operation subjects of the request acquisition unit 111 and the processing execution unit 112.

The request acquisition unit 111 receives an interrupt request based on each interrupt factor from the interrupt request generation unit 134. Then, the request acquisition unit 111 starts a process of reaping an interrupt. For example, once the core 11B receives an interrupt request based on each interrupt factor, the OS performs a context switch to switch the process to another and instructs a user process to perform processing of the interrupt request. Once the context switch is performed by the OS, the user process starts the process of reaping an interrupt. In such a way, the process of reaping an interrupt described below, the process being performed by the request acquisition unit 111, is started.

The request acquisition unit 111 sets the interrupt register write flag of the interrupt register 312 to "0", that is, "disable". Thus, the request acquisition unit 111 suppresses issuance of a new interrupt during the reaping process.

Next, the request acquisition unit 111 determines whether or not information on interrupt factors is stored in the interrupt queue 313. When information on interrupt factors is in the interrupt queue 313, the request acquisition unit 111 reads the head of interrupt factors in the interrupt queue 313 and deletes the read interrupt factor from the interrupt queue 313.

The request acquisition unit 111 then determines whether or not the request acquisition unit 111 has completed reading all the entries of the interrupt queue 313. When entries that have not been read remain in the interrupt queue 313, the request acquisition unit 111 repeats reading and deleting of entries from the interrupt queue 313 until no entry remains.

When there is no entry to be read in the interrupt queue 313, the request acquisition unit 111 determines whether or not the interrupt queue FULL flag of the interrupt register 312 is "1". If the interrupt FULL flag is "0", the interrupt queue 313 has room to store entries. It could therefore be said that an entry that has not been processed is not stored in the register set 311. For this reason, when the interrupt queue FULL flag is "0", the request acquisition unit 111 does not have to remove interrupt factors from the register set 311. The request acquisition unit 111 also sets the interrupt register write flag of the interrupt register 312 to "1", that is, "enable". Thus, prohibition on writing information on interrupt factors to the register set 311 and the interrupt queue 313 is removed, and then reception of a message from the node 1A, issuance of an availability notification interrupt, and so forth are resumed. Then, the request acquisition unit 111 finishes the process of reaping interrupt factors.

In contrast, if the interrupt queue FULL flag is "1", the interrupt queue 313 does not have room to store an entry, and it is considered that entries that have not been processed are stored in the register set 311. Therefore, the request acquisition unit 111 performs the process of reaping interrupt factors from the register set 311.

Specifically, the request acquisition unit 111 sets the interrupt queue FULL flag to "0". Next, the request acquisition unit 111 selects one of the entries of the register set 311. Specifically, the request acquisition unit 111 selects an entry of the register set 311 indicated by the read pointer of the register set 311.

The request acquisition unit 111 then checks whether or not either the message received interrupt flag or the availability notification interrupt pending flag of the selected entry of the register set 311 is on. Hereinafter, bits representing the message received interrupt flag and the availability notification interrupt pending flag are sometimes referred to collectively as "pending bits".

Here, when the message received interrupt flag is "1", the request acquisition unit 111 determines that the message received interrupt flag is on. When the availability notification interrupt pending flag is "1", the request acquisition unit 111 determines that the availability notification interrupt pending flag is on. When both the pending bits are "0", the request acquisition unit 111 determines that both are off.

When either of the pending bits is "1", the request acquisition unit 111 reads information on an interrupt factor stored in the selected register set 311. Then, the request acquisition unit 111 sets both the pending bits of the selected register set 311 to "0" and further deletes the entry stored in the selected register set 311 and clears the register set 311.

The request acquisition unit 111 repeats reading of entries from the register set 311 until all the entries have been read from the register sets 311. Specifically, the request acquisition unit 111 successively updates the read pointer of the register set 311 and repeats reading of entries until the request acquisition unit 111 has completed selecting all the register sets 311.

When all the entries have been read from the register sets 311, the request acquisition unit 111 sets the interrupt register write flag of the interrupt register 312 to "1", that is, "enable". Then, the request acquisition unit 111 finishes the process of reaping interrupt factors.

The processing execution unit 112 acquires interrupt requests acquired by the request acquisition unit 111. Then, the processing execution unit 112 sequentially processes the acquired interrupt requests.

Figure 7:
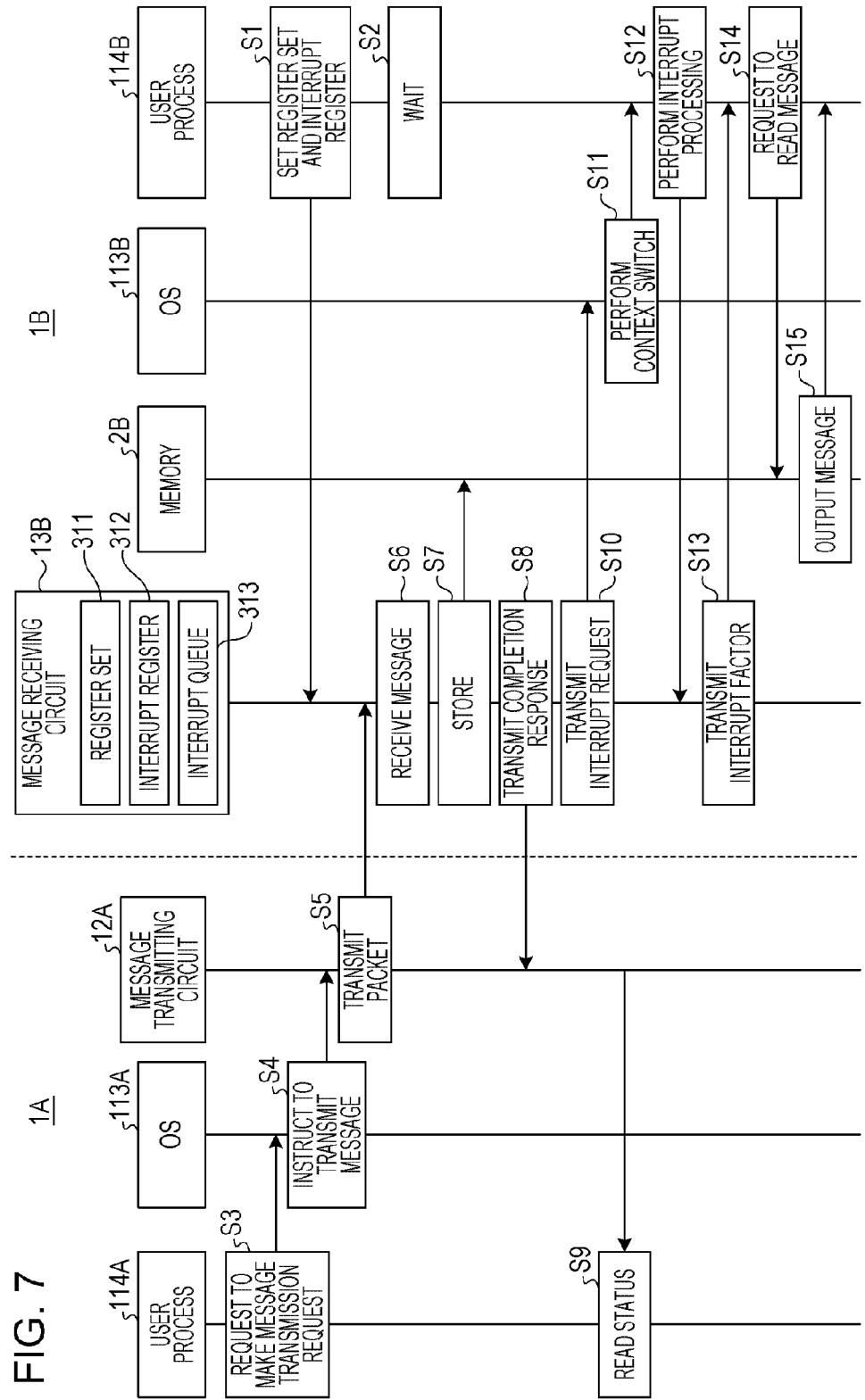
FIG. 7 is a flowchart of an overall flow of a process of notifying message reception using a message received interrupt, the process being performed by an information processing system according to the embodiment.

Next, with reference to FIG. 7, an outline of the flow of a process of notifying message reception using a message received interrupt performed by the information processing system according to this embodiment will be described. FIG. 7 is a flowchart of an overall flow of a process of notifying message reception using a message received interrupt, the process being performed by an information processing system according to the embodiment. Here, for the convenience of description, description will be given assuming that the OS 113A and the user process 114A run by the core 11A, and the OS 113B and the user process 114B run by the core 11B, are operation subjects. The OS 113B and the user process 114B correspond to the request acquisition unit 111. The vertical axis of FIG. 7 represents processing performed by each function illustrated in the upper portion of the drawing. The vertical axis of FIG. 7 also represents the passage of time as the position on the vertical axis moves down. Here, description will also be given assuming that the node 1A is a transmitting-side node and the node 1B is a receiving-side node.

The user process 114B, in response to an instruction from an operator, performs setting of the register set 311 and the interrupt register 312 (step S1). Specifically, the user process 114B sets the receiving-side availability notification interrupt flag, the number of available messages as the condition for interrupt issuance, and the message received interrupt flag of each entry of the register set 311 in accordance with the instruction from the operator. Here, the user process 114B sets both the receiving-side availability notification interrupt flag and the message received interrupt flag to "enable". The user process 114B also sets, to off, the availability notification interrupt pending flag and the message received interrupt pending flag, that is, sets the pending flags to "0". The user process 114B further sets the interrupt register write flag of the interrupt register 312 to "1", that is, to "enable", and sets the interrupt queue FULL flag to "0".

The message receiving circuit 13B, in response to an instruction from the user process 114B, performs setting of the register set 311, the interrupt register 312, and the interrupt queue 313.

The user process 114B then waits for performing message reception processing until a message is sent from the node 1A (step S2). However, the user process 114 may perform another processing while waiting.

When performing processing of transmitting a message, the user process 114A of the node 1A requests the OS 113A to make a message transmission request (step S3).

The OS 113A receives the request for the message transmission request from the user process 114A. Then, the OS 113A instructs the message transmitting circuit 12A to transmit a message (step S4).

The message transmitting circuit 12A receives, from the OS 113A, the instruction for transmitting a message. Then, the message transmitting circuit 12A generates a packet containing a message. Subsequently, the message transmitting circuit 12A transmits the generated packet to the message receiving circuit 13B of the node 1B (step S5).

The message receiving circuit 13B acquires the packet containing the message from the message transmitting circuit 12A of the node 1A. Then, the message receiving unit 132 of the message receiving circuit 13B receives the message contained in the received packet (step S6).

The message receiving unit 132 of the message receiving circuit 13B then stores the received message in the memory 2B (step S7). The message receiving unit 132 of the message receiving circuit 13B stores information on a message received interrupt in the interrupt queue 313 if there is available space in the interrupt queue 313, and stores information on a message received interrupt in the register set 311 if there is no available space. Subsequently, the message receiving unit 132 of the message receiving circuit 13B transmits a response of completion of message reception to the message transmitting circuit 12A of the node 1A (step S8).

The response generation unit 124 of the message transmitting circuit 12A of the node 1A transmits a completion response to the user process 114A. The user process 114A reads the status of message transmission from the received completion response (step S9).

On the other hand, the message receiving unit 132 of the message receiving circuit 13B instructs the interrupt request generation unit 134 to generate a request for a message received interrupt. Then, the interrupt request generation unit 134 of the message receiving circuit 13B generates a request for a message received interrupt and transmits the request to the OS 113B (step S10).

The OS 113B, upon receiving the request for a message received interrupt from the interrupt request generation unit 134 of the message receiving circuit 13B, performs a context switch (step S11).

The user process 114B, in response to performing of the context switch, starts interrupt processing (step S12).

The message receiving circuit 13B, in response to an instruction for reading from the user process 114B, transmits the designated interrupt factor to the user process 114B (step S13). At this point, the message receiving circuit 13B deletes or clears the entry of the interrupt factor from the interrupt queue 313 or the register set 311 where the read interrupt factor has been stored.

The user process 114B requests the memory 2B to read a message from an address designated by the acquired interrupt factor (step S14).

The memory 2B outputs a message stored at the designated address to the user process 114B (step S15).

Figure 8:
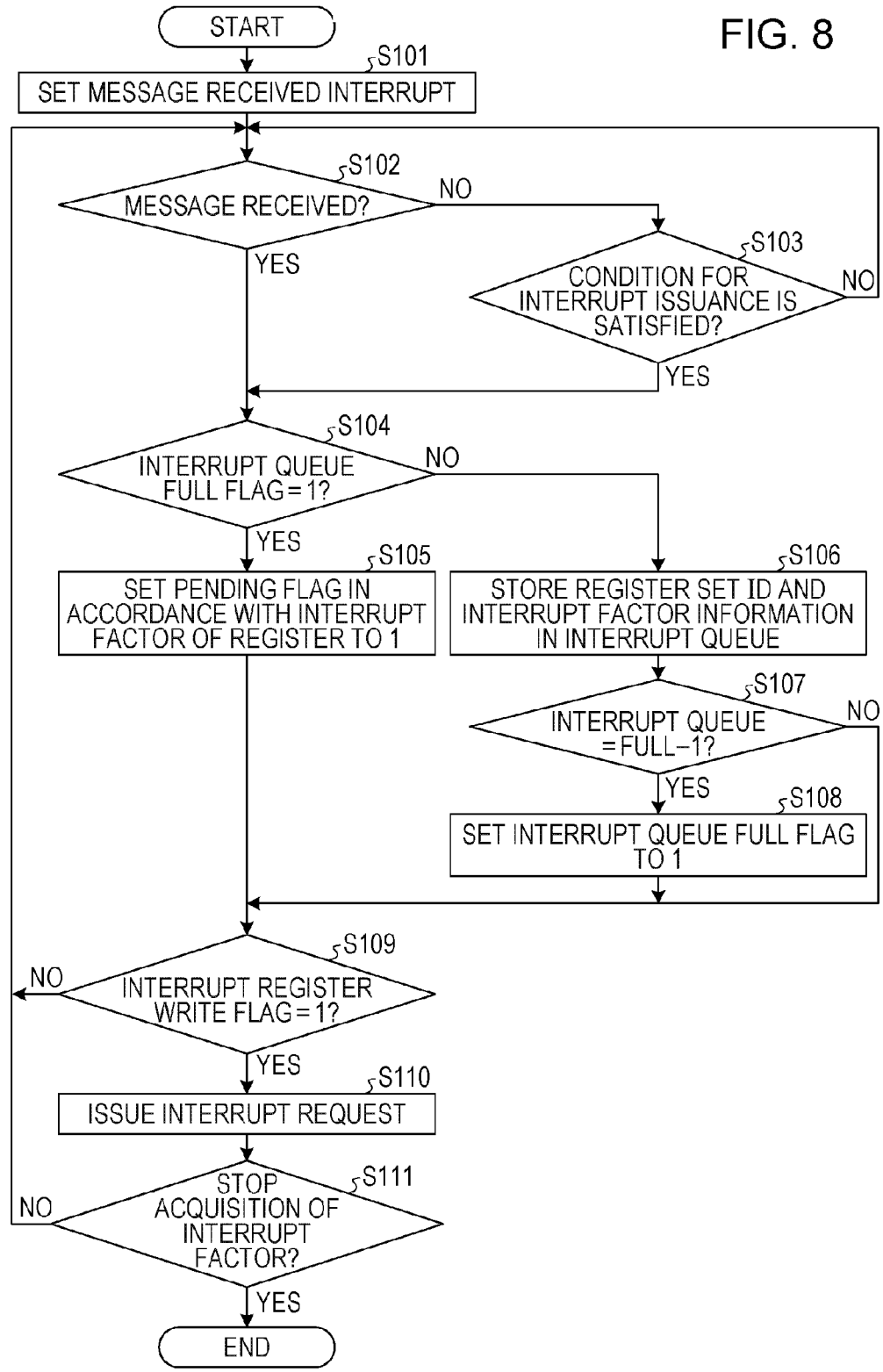
FIG. 8 is a flowchart of a process of storing an interrupt factor, the process being performed by the information processing device according to the embodiment.

Next, with reference to FIG. 8, a process of storing an interrupt factor, the process being performed by the information processing device according to this embodiment, will be described. FIG. 8 is a flowchart of a process of storing an interrupt factor, the process being performed by the information processing device according to the embodiment.

The receiving register 131, upon receiving an instruction from an operator, sets a message received interrupt (step S101). Here, the receiving register 131 sets the message received interrupt flag of the register set 311 to "enable".

The message receiving unit 132 determines whether or not a message has been received (step S102). When a message has been received (step S102: Yes), the message receiving unit 132 proceeds to step S104.

In contrast, when a message has not been received (step S102: No), the interrupt request generation unit 134 acquires the number of register sets 311 where no message is stored. Then, the interrupt request generation unit 134 determines whether or not the number of acquired register sets 311 where no message is stored satisfies the number of available messages as the condition for interrupt issuance, that is, satisfies the condition for interrupt issuance (step S103).

When the condition for interrupt issuance is not satisfied (step S103: No), the message receiving unit 132 and the interrupt request generation unit 134 return to step S102. In contrast, when the condition for interrupt issuance is satisfied (step S103: Yes), the message receiving unit 132 and the interrupt request generation unit 134 proceed to step S104. In the following processing, when a message has been received, the message receiving unit 132 performs the process, and when the condition for interrupt issuance is satisfied, the interrupt request generation unit 134 performs the process.

The message receiving unit 132 or the interrupt request generation unit 134 determines whether or not the interrupt queue FULL flag of the interrupt register 312 is equal to 1 (=1) (step S104).

When the interrupt queue FULL flag=1 (step S104: Yes), the message receiving unit 132 or the interrupt request generation unit 134 sets the pending flag in accordance with an interrupt factor of the register set 311 to "1" (step S105).

In contrast, when the interrupt queue FULL flag≠1 (step S104: No), the message receiving unit 132 or the interrupt request generation unit 134 stores a register set ID and information on the interrupt factor in the interrupt queue 313 (step S106).

Next, the message receiving unit 132 or the interrupt request generation unit 134 determines whether or not the number of entries of the interrupt queue 313 is "FULL-1" (step S107). In the drawing, the number of entries of the interrupt queue 313 is abbreviated simply as INTERRUPT QUEUE.

When the number of entries of the interrupt queue 313 is "FULL-1" (step S107: Yes), the message receiving unit 132 or the interrupt request generation unit 134 sets the interrupt queue FULL flag of the interrupt register 312 to "1" (step S108). In contrast, when the number of entries of the interrupt queue 313 is not "FULL-1" (step S107: No), the message receiving unit 132 or the interrupt request generation unit 134 proceeds to step S109.

The message receiving unit 132 or the interrupt request generation unit 134 determines whether or not the interrupt register write flag of the interrupt register 312 is "1", that is, "enable" (step S109). When the interrupt register write flag is not "1" (step S109: No), the message receiving unit 132 or the interrupt request generation unit 134 returns to step S102.

In contrast, when the interrupt register write flag is "1" (step S109: Yes), the interrupt request generation unit 134 generates an interrupt request and transmits it to the request acquisition unit 111 (step S110). However, in the case where a message has been received, the interrupt request generation unit 134 receives an instruction from the message receiving unit 132 and, following the instruction, performs transmission of an interrupt request.

The message receiving unit 132 or the interrupt request generation unit 134 determines whether or not to stop acquisition of an interrupt factor (step S111). For example, when an instruction for stopping execution of an interrupt from an operator, or when the operation of the information processing device is stopped, the message receiving unit 132 or the interrupt request generation unit 134 determines to stop acquisition of an interrupt factor.

When acquisition of an interrupt factor is not to be stopped (step S111: No), the message receiving unit 132 or the interrupt request generation unit 134 returns to step S102. In contrast, when acquisition of an interrupt factor is to be stopped (step S111: Yes), the message receiving unit 132 or the interrupt request generation unit 134 finishes the process of storing an interrupt factor.

Next, with reference to FIG. 9, a process of reaping interrupt factors that is performed by the information processing device according to this embodiment will be described. FIG. 9 is a flowchart of a process of reaping interrupt factors that is performed by the information processing device according to the embodiment.

The request acquisition unit 111 acquires an interrupt request from the interrupt request generation unit 134 (step S201).

The request acquisition unit 111 sets the interrupt register write flag of the interrupt register 312 to "0", that is, "disable" (step S202).

The request acquisition unit 111 reads an entry from the interrupt queue 313 (step S203).

The request acquisition unit 111 determines whether or not there is an interrupt factor in the interrupt queue 313 (step S204).

When there is an interrupt factor (step S204: Yes), the request acquisition unit 111 reads the interrupt factor, and deletes the read interrupt factor and clears the entry (step S205).

Next, the request acquisition unit 111 determines whether or not reading of all the entries stored in the interrupt queue 313 has been completed (step S206). When an entry that has not been read remains (step S206: No), the request acquisition unit 111 returns to step S203.

In contrast, when reading of all the entries has been completed (step S206: Yes), the request acquisition unit 111 determines whether or not the interrupt queue FULL flag of the interrupt register 312 is "1" (step S207). When the interrupt queue FULL flag≠1 (step S207: No), the request acquisition unit 111 returns to step S203.

In contrast, when the interrupt queue FULL flag=1 (step S207: Yes), the request acquisition unit 111 sets the interrupt queue FULL flag to "0" (step S208).

The request acquisition unit 111 then reads an entry from the register set 311 indicated by the read pointer (step S209).

Next, the request acquisition unit 111 determines whether or not the pending flag of the read entry is "1" (step S210). When the pending flag≠1 (step S210: No), the request acquisition unit 111 proceeds to step S212.

In contrast, when the pending flag=1 (step S210: Yes), the request acquisition unit 111 reads information on an interrupt factor and deletes the read entry (step S211). Specifically, the pending flag is cleared to zero.

Subsequently, the request acquisition unit 111 determines whether or not reading of all the entries of the register set 311 has been completed (step S212). When an entry that has not been read remains (step S212: No), the request acquisition unit 111 updates the read pointer of the register set 311 (step S213) and returns to step S209.

In contrast, when reading of all the entries has been completed (step S212: Yes), the request acquisition unit 111 returns to step S203.

On the other hand, when there is no interrupt factor in the interrupt queue 313 (step S204: No), the request acquisition unit 111 sets the interrupt register write flag of the interrupt register 312 to "1", that is, "enable" (step S214).

The request acquisition unit 111 then completes reading of an interrupt factor (step S215). Thus, the process of reaping interrupt factors finishes.

Here, the process of storing an interrupt factor illustrated in FIG. 8 and the process of reaping interrupt factors illustrated in FIG. 9 operate independently. For this reason, while the reaping process is performed, interrupt factors will be stored despite of the fact that an interrupt request is not issued. Consequently, when the reaping process is started, all the interrupt factors stored in the interrupt queue 313 and the register set 311 will be reaped without waiting for issuance of an interrupt request, as long as interrupt factors are stored. In particular, unless the interrupt queue FULL flag is "1", interrupt factors will be stored in the interrupt queue 313. The request acquisition unit 111 may therefore reap interrupt factors from the interrupt queue 313 at high speed.

Since the interrupt queue 313 is FIFO, it is possible to efficiently reap interrupt factors by sequentially reading queues. In contrast, in reaping interrupt factors from the register set 311, it is unknown that an interrupt factor that has not been processed is present in which entry. Therefore, all the entries have to be read and checked. In the case of a large number of entries, in which the number of entries is typically several hundreds to several thousands, it takes much time to reap interrupt factors.

In the above, description has been given assuming that the node 1A is the transmitting-side node and the node 1B is the receiving-side node. However, the node 1A and the node 1B have similar functions and thus may operate even when the transmitting side and the receiving side are reversed.

As described above, the information processing device according to this embodiment is provided with the interrupt queue of FIFO. When there is available space in the interrupt queue, interrupt factors are stored in the interrupt queue. When there is no available space in the interrupt queue, interrupt factors are stored in the register set. The information processing device according to this embodiment reaps interrupt factors first from the interrupt queue, and then, if there are interrupt factors in the register set, reaps these interrupt factors. In such a way, if the number of interrupts is less than the maximum number of interrupts held in the interrupt queue, reaping may be performed without reading the register set. This reduces time taken for the interrupt reap process, making it possible to perform the interrupt reap process at high speed. In addition, for interrupt factors that are unable to be stored in the interrupt queue, the interrupt factors are stored in the register set and are read after reading of interrupt factors from the interrupt queue. Thus, omissions in the reaping interrupt factors may be reduced. Furthermore, issuance of an interrupt is prohibited during the reaping processing, and thus interrupt factors may be reaped without omission.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing device comprising:
   a first storage;
   a second storage;
   a memory; and
   a processor coupled to the memory and configured to:
      manage receipt of processing information, and storage of the processing information in a storage region, the storage region being determined to correspond to one of the first storage or the second storage based on a storage region flag;
      acquire the processing information from the first storage and the second storage, the first storage providing the processing information sequentially in the order the processing information was stored in the first storage; and
      acquire the processing information from the second storage when the first storage has a filled state, and do not acquire the processing information from the second storage when the first storage does not have a filled state.

2. The information processing device according to claim 1,
   wherein when storing the processing information to the second storage, the processor is further configured to add waiting information indicative that the processing information being stored has not been acquired, and
   wherein when acquiring the processing information from the second storage, the processor is further configured to determine whether or not the waiting information is added.

3. The information processing device according to claim 1,
   wherein when having stored the processing information in the first storage or the second storage, the processor is further configured to notify of an execution request that is indicated by the stored processing information, and
   wherein the processor is further configured to receive notification of the execution request, to initiate acquiring the processing information from the first storage and the second storage, and to respond to the notification of the execution request.

4. The information processing device according to claim 1, the processor being further configured to:
   generate a location indication indicating that the storage region is present in either the first storage or the second storage,
   wherein the first storage stores the location indication and is operative to output the location indication,
   wherein the second storage stores the location indication, the processor being further configured to:

store the location indication in the first storage when the storage region corresponds to the first storage, and store the location indication in the second storage when the storage region does not correspond to the first storage, and acquire the location indication output by the first storage, when the location indication is present in the first storage, and acquire the location indication when the location indication is not stored in the first storage.

5. The information processing device according to claim 1, wherein the processing information is interrupt factor information.

6. An information processing system comprising a first information device and a second information device,
the first information device operative to transmit processing information,
the second information device including
a first storage;
a second storage;
a memory; and
a processor coupled to the memory and configured to:
manage receipt of the processing information, and storage of the processing information in a storage region, the storage region being determined to correspond to one of the first storage or the second storage based on a storage region flag;
acquire the processing information from the first storage and the second storage, the first storage outputting the processing information sequentially in the order the processing information was stored in the first storage; and
acquire the processing information from the second storage when the first storage has a filled state, and do not acquire the processing information from the second storage when the first storage does not have a filled state.

7. An interrupt device control method comprising:
receiving processing information;
when a storage region corresponds to a first storage, storing the processing information in the first storage;
when the storage region does not correspond to the first storage, storing the processing information in a second storage; and
acquiring the processing information from the second storage when the first storage has a filled state, and not acquiring the processing information from the second storage when the first storage does not have a filled state.

8. The information processing device according to claim 1, wherein the processor is further configured to search the second storage so as to detect and acquire the processing information.

9. The information processing device according to claim 1,
wherein the processor is further configured to perform the predetermined processing in accordance with the processing information.

* * * * *